United States Patent [19]

Black

[11] Patent Number: 4,835,621

[45] Date of Patent: May 30, 1989

[54] GUN MOUNTED VIDEO CAMERA

[76] Inventor: John W. Black, 5281 M-43,, Hickory Corners, Mich. 49060

[21] Appl. No.: 116,499

[22] Filed: Nov. 4, 1987

[51] Int. Cl.$^4$ ............................................. H04N 5/782
[52] U.S. Cl. .................................... 358/335; 358/906; 352/95; 354/82; 354/76; 354/293
[58] Field of Search ............... 358/335, 906, 909, 209, 358/224; 354/81, 82, 76, 293; 352/95

[56] References Cited

U.S. PATENT DOCUMENTS

| | | | |
|---|---|---|---|
| 3,427,102 | 2/1969 | Wade | 352/95 |
| 3,545,356 | 12/1970 | Nielsen | 352/95 X |
| 3,877,048 | 4/1975 | Kellner | 354/82 X |
| 4,309,095 | 1/1982 | Buckley | 354/81 |
| 4,630,911 | 12/1986 | Paul | 352/95 X |

FOREIGN PATENT DOCUMENTS 0079169 11/1919 Australia ............................. 352/95

*Primary Examiner*—Robert L. Richardson
*Attorney, Agent, or Firm*—Flynn, Thiel, Boutell & Tanis

[57] ABSTRACT

A video camera recording device having a gunstock and a support structure for which includes a mounting platform adapted to receive thereon a hand held video camera recorder haing a lense structure defining a line of sight, a recording medium for recording video information, and a viewfinder and mounting structure for mounting the viewfinder onto the gunstock. Structure is provided for effecting a sequential activating and deactivating of the video camera recording device for the purpose of starting a recording of video information onto the recording medium and stopping the recording, respectively. A gun sight is located in the line of sight so as to be visible through the viewfinder when the video camera recorder is recording video information on the recording medium. A trigger is provided on the gunstock and is adapted to be manually activated by a finger of a user's hand. A signal generator is provided which generates a signal visible through the viewfinder in response to the user activating the trigger. The signal is also simultaneously recorded on the recording medium.

20 Claims, 6 Drawing Sheets

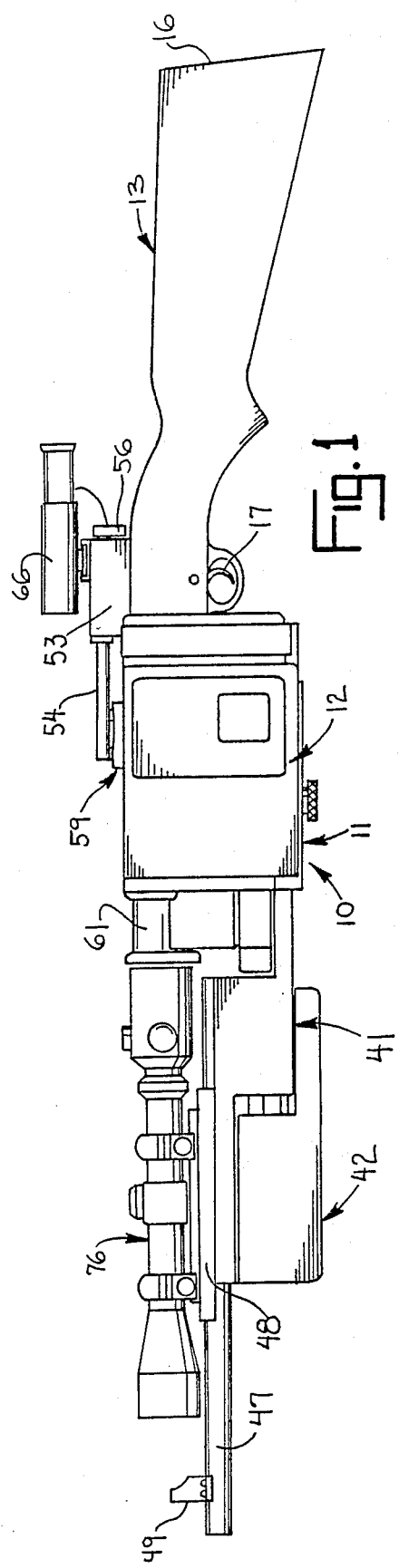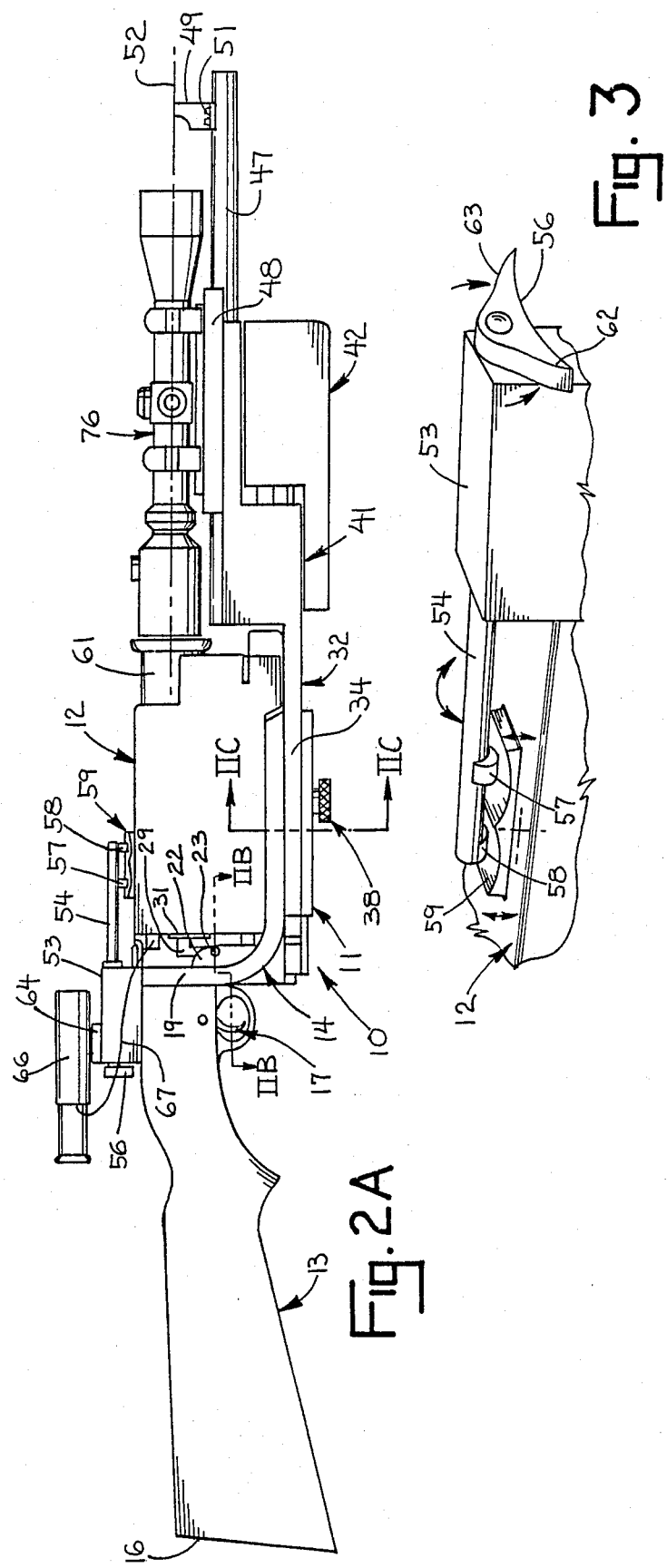

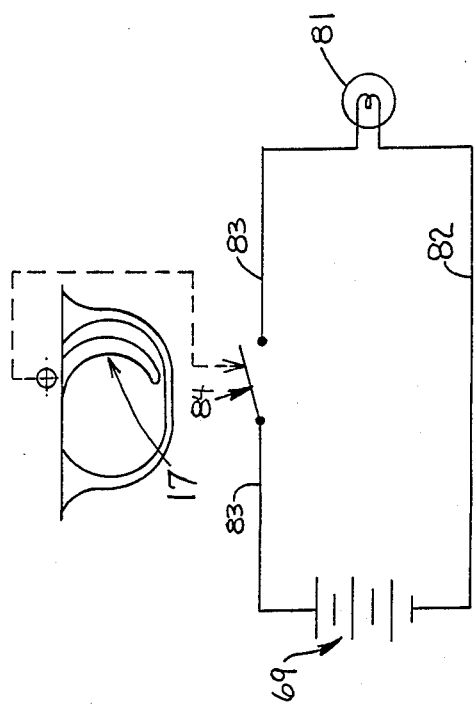
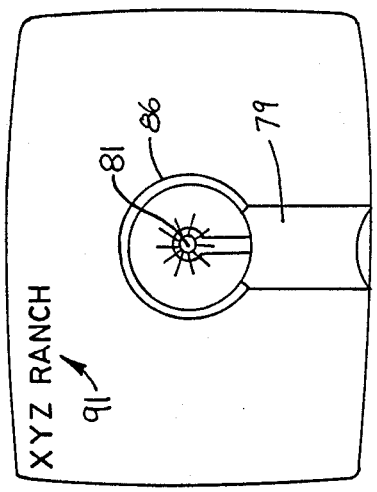
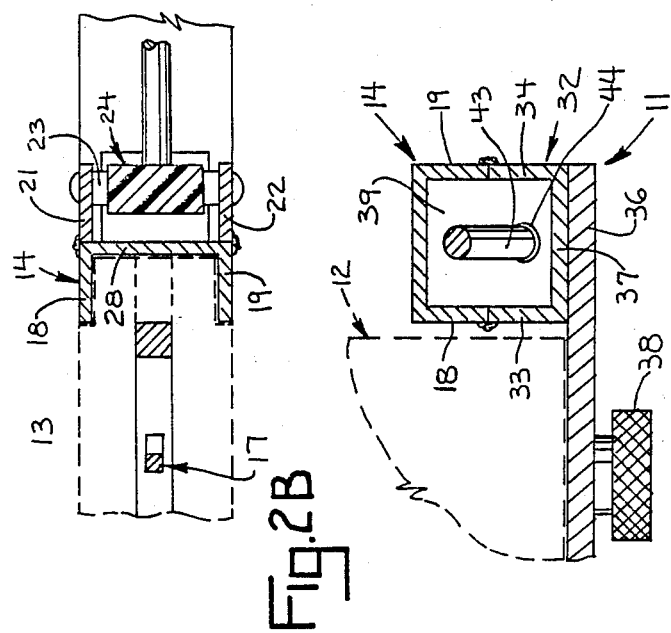

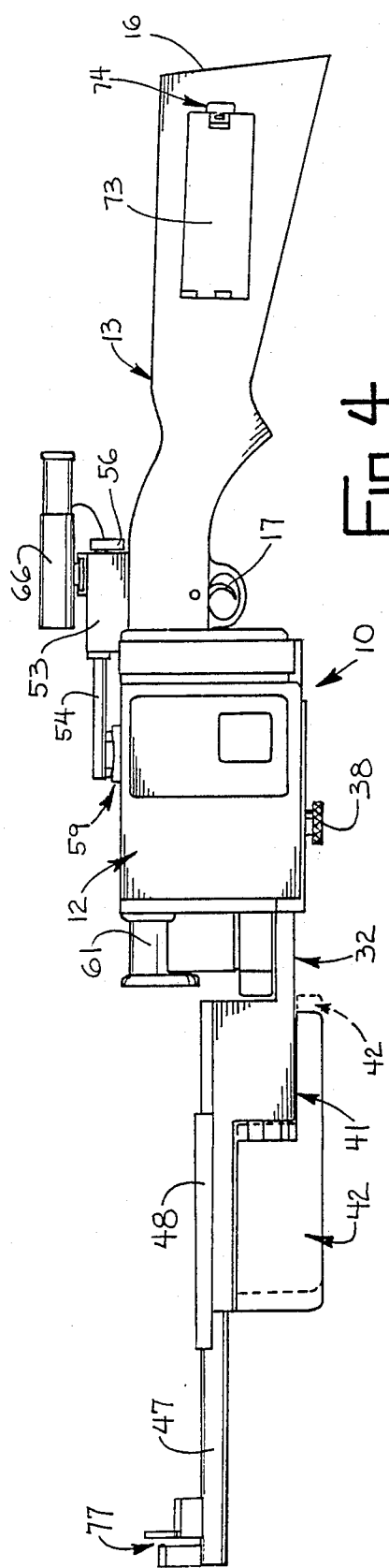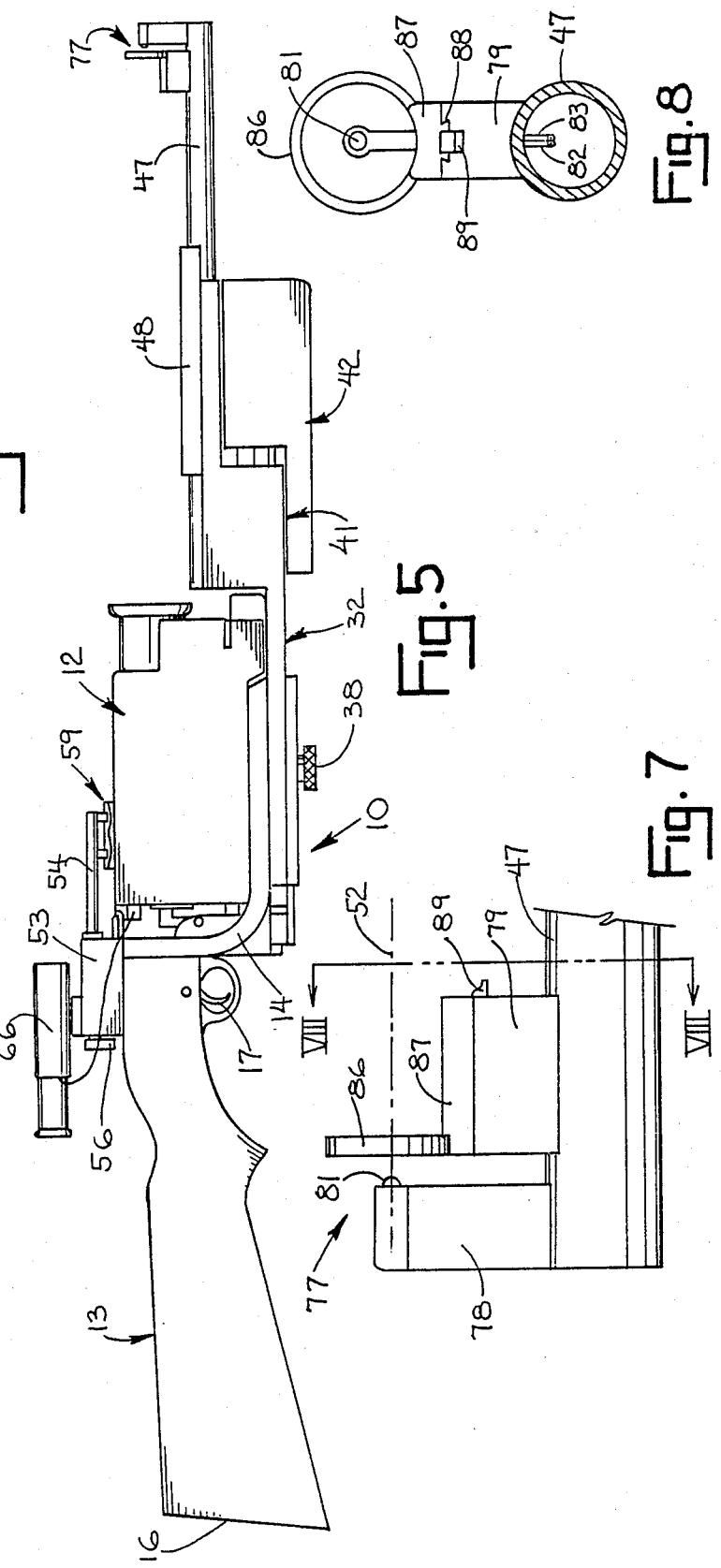

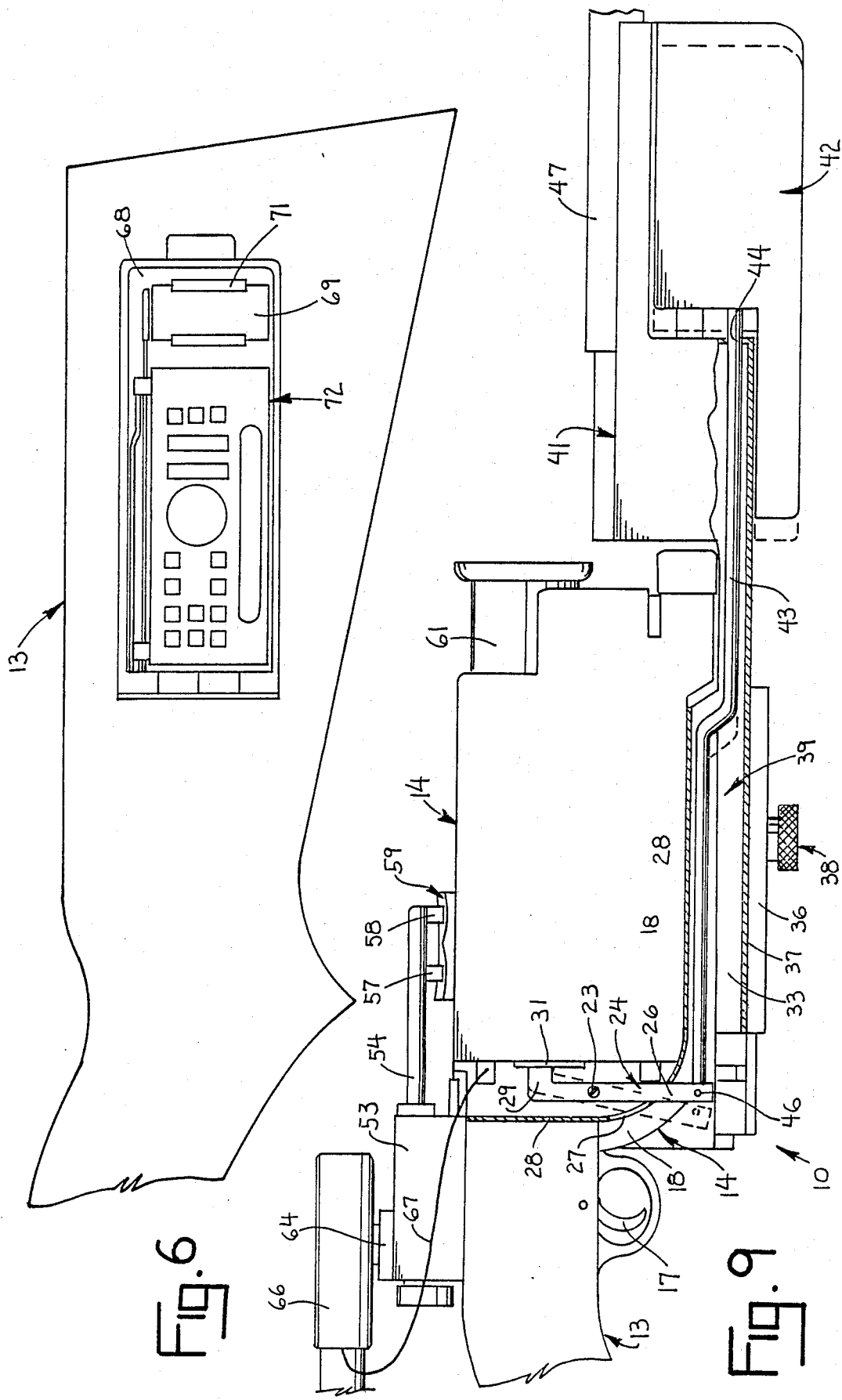

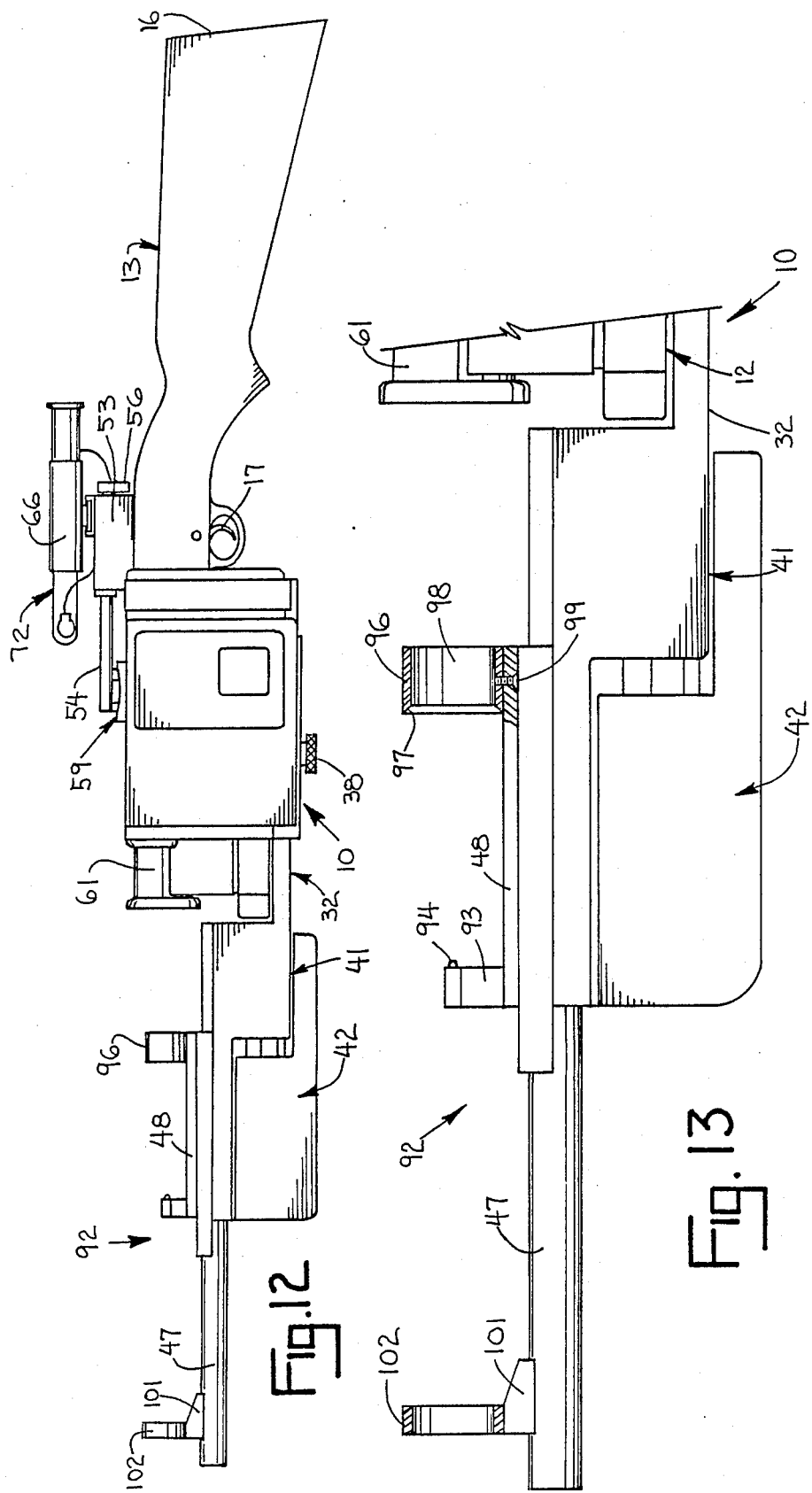

GUN MOUNTED VIDEO CAMERA

FIELD OF THE INVENTION

This invention relates to a video camera recording device and, more particularly, to a video camera recording device incorporated into a gun-like mounting structure which can be raised to the shoulder and sighted at an object in the same way that a gun is usually raised to the shoulder and aimed.

BACKGROUND OF THE INVENTION

Camera devices incorporated into gun-like structures are known. These structures facilitate a raising of the structure to the shoulder so that the camera can be sighted at an object in the same way that a gun is usually raised to the shoulder and aimed. Examples of these types of devices are shown in U.S. Pat. Nos. 624,693, 730,458, and 1,190,000. The cameras utilized in the aforementioned references are photographic cameras capable of taking "still" pictures. In U.S. Pat. No. 1,190,000, a rifle-like device having a pump mechanism thereon is provided, wherein the trigger is operatively connected to a shutter releasing device and the pump mechanism is connected with the film roll of the camera so that the roll is turned and the film wound thereon as the pump mechanism is moved longitudinally of the barrel. Further, the gun barrel is provided with a suitable sight and this registers with cross threads placed in the camera and the threads leave cross lines upon the film when the same is exposed and the point of intersecting of the lines indicates upon the picture the accuracy of aim exercised at the time that the film is exposed.

The popularity of video camera recording devices has been on the increase over the last several years. Heretofore, video camera recording devices have been quite large and have required the provision of a substantial battery pack to power the camera and effect a recording of information on the recording medium. Recently, however, the batteries have been miniaturized and a hand held video camera recorder capable of recording information on recording medium is now readily available.

This invention incorporates a conventional video camera recording device onto a structure resembling a rifle which can be raised to the shoulder and sighted at an object in the same way that a gun is usually raised to the shoulder and aimed.

Heretofore, it has not been possible for a spectator at a competitive shooting event to monitor "live" the shooting action along the line of sight observed by a participant. Accordingly, it is desirable to provide a device which will enable spectators to monitor the "live" shooting action along the line of sight observed by a contestant in a shooting contest or by playing a recording of the shooting action shortly after the event has occurred.

It is, therefore, a primary object of the invention to provide a video camera recording device mounted on a gun-like mounting structure which can be raised to the shoulder and sighted at an object in the same way that a gun is usually raised to the shoulder and aimed.

It is a further object of the invention to provide structure on the video camera recording device which generates a signal visible through the viewfinder of the video camera and, therefore, is recordable on the recording media so that the user can effect, following an activating of the video camera, an aiming of the line of sight of the device at a target so as to bring the target into view through the viewfinder and to simultaneously record the target on the recording medium, aligning the target with the gun sight structure and the line of sight, activating a trigger to activate the signal generating device and to simultaneously record the signal on the recording medium thereafter followed by a deactivation of the video camera recorder device.

It is a further object of this invention to provide a gun sight in the form of a ring representing the spread of gun shot as the shot moves away from the end of the rifle, the signal generating structure becoming visible in the viewfinder the moment that the trigger is activated to indicate the moment in time that the user believes that the target will be struck by an imaginary projectile once the trigger is activated. All of this would be recorded on the recording media.

It is a further object of the invention to provide a video camera recording device, as aforesaid, which will enable hunters to stalk game and "shoot" same, namely, record the video imagery onto the recording medium for later playback and review by other members of the hunting party.

It is a further object of the invention to provide a video camera recording device, as aforesaid, for enabling spectators to watch "live" action along the line of sight observed by a participant in a competitive event, namely, an aiming of the video camera recording device at a stationary or moving target and noting the accuracy of the competitor by noting the moment in time that the competitor activates the trigger mechanism, the point in time of activation being indicated by video displayed information.

It is a further object of the invention to provide a video camera recording device, as aforesaid, wherein hunting lodges can provide its guests with video recording camera devices for purposes of "shooting" wild game on adjacent premises, each "shooting" event having the name of the lodge displayed on the video, thereby enabling the lodge to send video tape recordings to its prospective customers for the purpose of advertising the availability of wild game on premisses adjacent the lodge.

It is a further object of the invention to provide a video camera recording device, as aforesaid, wherein a conventional lense adjusting feature is included on the video camera capable of zooming toward or zooming away from a given target, and wherein structure is provided for enabling operation of the lense structure with a single digit on the same hand of the user that activates the trigger, the structure being oriented so that the user can simultaneously engage the trigger and manipulate the lense structure on the video camera for purposes of zooming toward or away from a specified target.

It is a further object of the invention to provide a video camera recording device, as aforesaid, wherein a light is provided for illuminating the target.

SUMMARY OF THE INVENTION

The objects and purposes of the invention are met by the provision of a video camera recording device having a gunstock and a gun barrel with support structure being provided for interconnecting the gunstock to the gun barrel. The support structure includes a mounting platform adapted to receive thereon a hand held video camera recorder having a lense structure defining a line of sight, a recording medium for recording video information, and a viewfinder and mounting structure for mounting the viewfinder onto the gunstock. Structure is provided for effecting a sequential activating and deactivating of the video camera recording device for the purpose of starting a recording of video information onto the recording medium and stopping the recording, respectively. A gun sight is located in the line of sight so as to be visible through the viewfinder and especially when the video camera recorder is recording video information on the recording medium. A trigger is provided on the gunstock and is adapted to be manually activated by a finger of a user's hand. A signal generator is provided which generates a signal visible through the viewfinder in response to the user activating the trigger. The signal is also simultaneously recorded on the recording medium. Thus, the user can effect an activating of the video camera recorder device, aiming the line of sight at a target so as to bring the target into view through the viewfinder and to simultaneously record the target on the recording medium, aligning the target with the gun sight and the line of sight, activating the trigger to activate the signal generator to provide a signal visible through the viewfinder and to simultaneously record the signal on the recording medium and, lastly, deactivate the video camera recorder device.

BRIEF DESCRIPTION OF THE DRAWINGS

Other objects and purposes of the invention will become apparent to those skilled in the art upon a reading of the specification with reference to the drawings described, in which:

FIG. 1 is a side elevational view of a video camera recording device embodying the invention;

FIG. 2A is a side view of the opposite side of the video camera recording device illustrated in FIG. 1;

FIG. 2B is a sectional view taken along the line IIB—IIB of FIG. 2A;

FIG. 2C is a sectional view taken along the line IIC—IIC of FIG. 2A;

FIG. 3 is an enlarged prospective view of a device for operating the telephoto lense on the video camera recording device;

FIG. 4 is a side view of a video camera recording device without a telephoto lense;

FIG. 5 is a side view of the opposite side of the video camera recording device illustrated in FIG. 4;

FIG. 6 is an enlarged side view of the gunstock illustrated in FIG. 4 and showing a compartment housing a character generator device enabling readable information to be displayed in the viewfinder and recorded on the recording media;

FIG. 7 is an enlarged side view of the end of the gun barrel illustrated in FIG. 4;

FIG. 8 is a sectional view taken along the line VIII—VIII of FIG. 7;

FIG. 9 is an enlarged fragment of the side view illustrated in FIG. 5, but with a portion of the structure being sectioned to reveal the structure for activating the video camera recording device;

FIG. 10 is an electrical schematic of a trigger activating signalling device;

FIG. 11 is a representative illustration of the view seen through a viewfinder, which view includes identification information provided by a character generator device and a signalling lamp indicative of an activation of the trigger;

FIG. 12 is a side view of a video camera recording device without a telephoto lense construction;

FIG. 13 is an enlarged side view of the gun sight illustrated in FIG. 12; and

DETAILED DESCRIPTION

Figure 14:
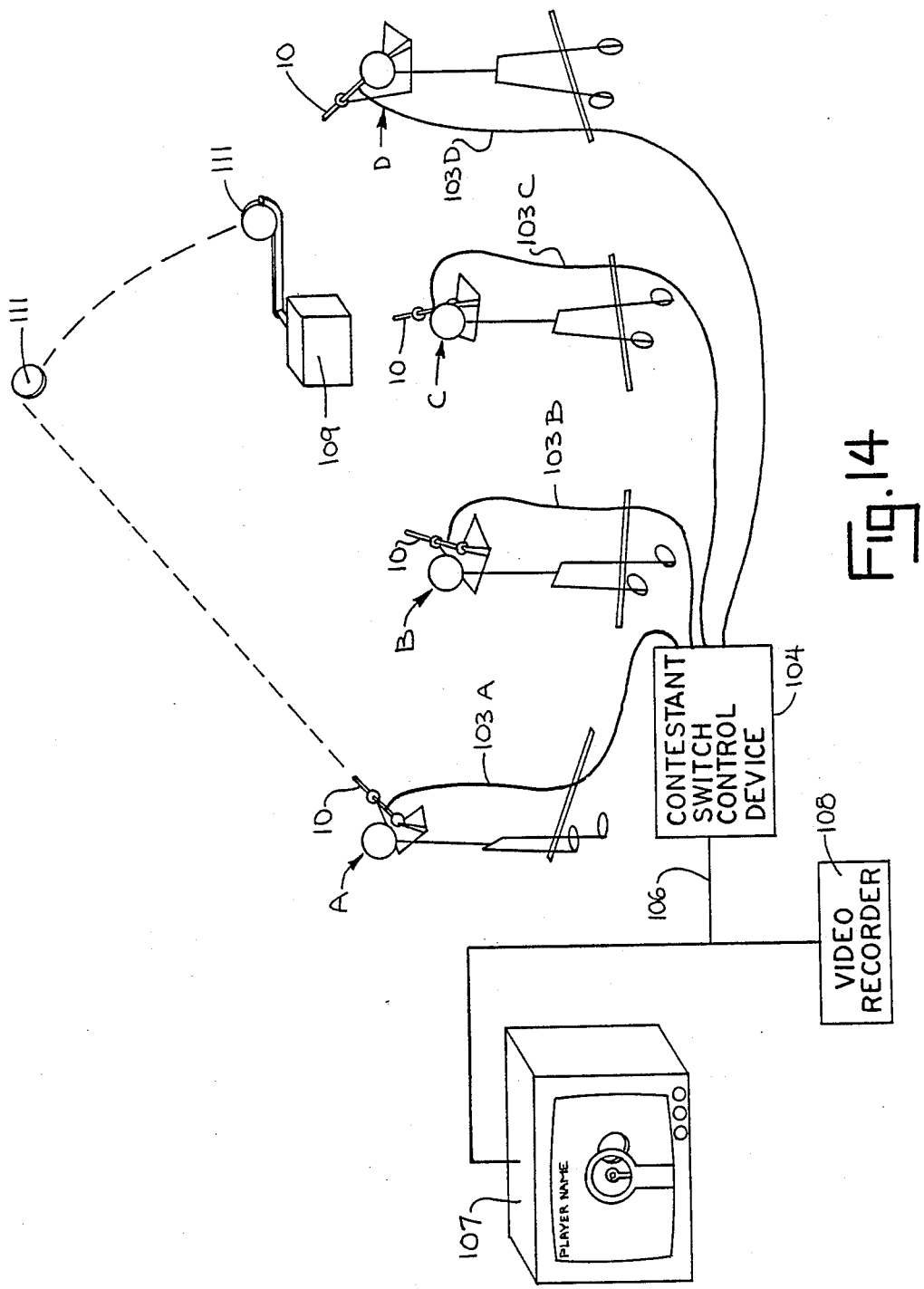
FIG. 14 is a view illustrating a game having four contestants shooting at a target launched by a target launcher.

A video camera recording device 10 embodying my invention is illustrated in the drawings. The video camera recording device 10 includes a support structure 11 for supporting a video camera recorder 12, such as a model JUC GZ-SSU camera marketed by JVC, Victor Company of Japan, Ltd. An elongated gunstock 13 is connected to the support structure 11 by a bracket 14 which is bent to a L-shape (FIG. 2). The gunstock 13 has a shoulder engaging surface 16 at a rear end thereof remote from the end to which the bracket 14 is connected. In addition, the gunstock 13 has a trigger mechanism 17.

The bracket 14 has an inverted U-shaped cross section. The legs 18 and 19 (FIG. 2B) on one leg of the L-shaped bracket 14 are fastened to the front end of the gunstock 13. The legs 18 and 19 straddle the sides of the gunstock and are fastened by fastening structure not illustrated. A pair of laterally spaced plates 21 and 22 are fastened to the bracket 14 as shown in FIG. 2B and in FIG. 2A. The plates 21 and 22 are coplanar with the side plates 18 and 19 on the bracket 14 and support a pivot axle 23 therebetween. A two arm lever 24 is pivotally mounted on the axle 24 as best illustrated in FIG. 9. The arm 26 of the lever 24 extends through an opening 27 in the bight wall 28 of the U-shaped bracket 14. The arm 29 of the lever 24 has an enlargement thereon which engages an on/off button on the video camera recorder 14.

A U-shaped channel member 32 (FIGS. 1, 2A and 2C) has two laterally spaced upstanding legs 33 and 34 thereon which are aligned with and secured to the legs 18 and 19 on the bracket 14. A mounting plate 36 is secured to the bottom face of a bight wall 37 of the channel 32 and is cantilevered to one side thereof as illustrated in FIG. 2C. A knurled knob 38 attached to a screw (not illustrated) is provided on the mounting plate 36 and is utilized in a conventional manner to secure the video camera recorder 12 to the mounting plate 36. The connected inverted U-shaped bracket 14 and the U-shaped channel 32 define an internal passageway 39.

A guide structure 41 is secured to the forward end of the U-shaped channel 32. The guide structure 41 slidably supports a grip 42 for movement longitudinally of the U-shaped channel 32, namely, forwardly and backwardly. A rod 43 extends through an opening 44 in a front wall of the U-shaped channel 32 and is connected to the grip 42 in a conventional manner. Forward and rearward movement of the grip 42 will cause a forward and rearward movement of the rod 43. The rear end of the rod 43 is connected by a pivot pin 46 to an end of the lever arm 26 remote from the pivot axle 23. In other words, a rearward movement of the grip 42 to the broken line position in FIG. 9 will effect a clockwise pivoting of the lever 24 causing the enlargement on the arm 29 to push on the on/off button 31 on the video camera recorder 14 to turn the camera on, for example. A spring, not illustrated, can be utilized to effect a return of the grip 42 to the solid line position. A second rearward movement of the grip 42 will cause the enlargement on the lever arm 29 to again push on the on/off button 31 on the video camera recorder 14 to turn the camera off, for example.

An elongated gun barrel 47 is secured to the guide structure 41 and extends forwardly therefrom. The gun barrel 47 is comprised of a hollow tubular piece of metal as shown, for example, in FIG. 8. In addition, and if desired, a further mounting plate 48 can be mounted on the guide structure 41 in a manner sandwiching the gun barrel 47 between the mounting plate 48 and the guide structure 41. The purpose for providing the mounting plate 48 will be explained in more detail below.

A gun sight 49 is mounted on the gun barrel 47 at the forwardmost end thereof. In this particular embodiment, a hinge 51 is provided to enable the gun sight 49 to be pivoted into and out of alignment with a line of sight 52 defined by the visual center of the optics in the video camera recorder.

A mounting block 53 is mounted on the forward end of the gunstock 13 on the upper side thereof. The mounting block 53 rotatably supports an elongated rod 54 therein, which rod has a two arm lever 56 secured to the rear end thereof. The forward end of the rod has a pair of cam pieces 57 and 58 thereon, which cam pieces are spaced axially along the length of the rod 54 and the high point of each cam piece is arcuately spaced from one another about the axis of the rod 54. The rod 54 extends above a teeter-totter switch 59 on the video camera recorder 12 which activates a servo mechanism inside the video camera recorder for varying the optics of a telephoto lense between limits of adjustment thereof. The centrally viewed part of the optics of the telephoto lense 61 define, as stated above, the line of sight 52. Thus, a manual engagement by, for example, the thumb of the user, to either the arm 62 or the arm 63 of the lever 56 will cause a rotation of the rod 54 to bring either the cam piece 57 or the cam piece 58 into operable engagement with the teeter-totter switch 59 to activate the servo mechanism for altering the optics of the telephoto lense 61.

A pedestal 64 is provided on the upper surface of the mounting block 53 and includes structure for facilitating a mounting of a conventional viewfinder 66 which is coupled by a wire 67 to the video camera recorder 12. The viewfinder has a screen thereon for displaying video imagery developed by the video camera recorder.

A recess 68 is provided in the gunstock 13 as illustrated in FIG. 6. A conventional battery, such as a miniature nine volt battery, 69 is mounted in a battery holding bracket 71 inside the recess 68. In addition, a character generator 72, such as a model CG-P50, marketed by JVC, Victor Company of Japan, Ltd., is mounted in the recess 68. A hinged cover 73 (FIG. 4) is hingedly secured to the gunstock 13. A releasable catch mechanism 74 is provided to lock the cover 73 in a closed position. The purpose of the battery 69 and the character generator 72 will be explained in more detail below.

As shown in FIGS. 1 and 2A, a telephoto lense scope mechanism 76 is mounted on the mounting plate 48 so that the line of sight thereof is aligned with the line of sight 52 for the telephoto lense 61 on the video camera recorder 12. A use of the telescopic scope 76 is optional, as is clearly depicted by the arrangement illustrated in FIGS. 4, 5, 9, 12 and 13. However, the telephoto lense scope 76 has a set of crossed lines therein which assist the user of the video camera recording device in aligning the line of sight 52 with a designated target. The crossed lines are in alignment with the gun sight 49 provided on the end of the gun barrel 47. However, the hinge structure 51 allows the gun sight 49 to be pivoted out of the line of sight 52 so that only the crossed lines on the scope 76 can be utilized in aligning the line of sight 52 with the designated target.

In the arrangement illustrated in FIGS. 4, 5, 7 and 8, a modified gun sight 77 is provided on the end of the gun barrel 47. More specifically, a pair of axially spaced pedestals 78 and 79 are mounted on the upper surface of the gun barrel 47. A lamp 81 is mounted on the endmost pedestal 78, the central point of the lamp 81 being positioned on the line of sight 52, as shown in FIG. 7. Two wires 82 and 83 (FIG. 8) are connected to the lamp 81 and extend preferably through the barrel 47, the passageway 39 and a further set of passageways in the gunstock (not illustrated) to the recess 68. One of the wires, for example, the wire 83, is interrupted by an on/off switch 84 (FIG. 10). The ends of the wires 82 and 83 remote from the lamp 81 are connected to opposite ends of the battery 69 in the recess 68. When the user pulls the trigger 17 rearwardly, the switch 84 will be closed and the lamp 81 will become illuminated, as schematically shown by the broken line representation in FIG. 10.

A ring 86 is mounted onto a base 87. The base 87 is connected by means of a dove-tail slide arrangement 88 to the upper surface of the pedestal 79 oriented rearwardly from the pedestal 78 as illustrated in FIGS. 7 and 8. The center point of the ring 86 is coincident with the line of sight 52. A latch 89 is provided for locking the base 87 to the pedestal 79. Thus, upon activation of the video camera recorder 12, the view as seen through the viewfinder 66 is represented in FIG. 11. A target can be aligned with the line of sight indicated by the lamp 81 oriented in the central portion of the ring 86. Once the target is inside the ring 86 and aligned with the line of sight 52 or the center of the lamp 81, the user can pull the trigger to cause the lamp 81 to become illuminated. The character generator 72 mentioned above will cause designated and desired indicia 91 to also appear on the screen of the viewfinder 66 either continuously or in response to an activation of the trigger 17.

Another gun sight arrangement 92 is illustrated in FIGS. 12 and 13. In this particular embodiment, a pedestal 93 is mounted on the mounting plate 48 and has a lamp 94 thereon. Intermediate the lamp 94 and the telephoto lense 61 on the video camera recorder 12 there is provided a hollow cylindrical ring 96 having a beveled reflective surface 97 on the end thereof facing the lamp 97. When the lamp 94 becomes illuminated, light rays will be reflected off from the beveled surface 97 onto the internal surface 98 of the ring 96. The reflected light on the interior surface 98 of the ring 96 will be visible on the screen of the viewfinder 66 as a halo around the lamp as seen through the viewfinder represented in FIG. 11. In this particular embodiment, the cylindrical ring 96 is secured by a screw 99 to the mounting plate 48.

The gun sight 9 includes a further pedestal oriented at the forward end of the gun barrel 47 and on which is mounted a hollow cylindrical ring 102. The center point of the ring 96 and the ring 102 are both coincident with the line of sight 52 and the center point of the lamp 94.

A still further gun sight embodiment includes the provision of a set of crossed lines permanently etched on the viewfinder screen, such as depicted by the broken lines 112 and 113 in FIG. 11. In the alternative, a character or line generator 114 (see broken line representation in FIG. 6) can be utilized in electronically generating the set of crossed lines on the viewfinder screen and capable of being recorded on the recording medium.

A light source 116 can be provided in the free end of the gun barrel 47 (FIG. 1). A battery therefor is provided in the compartment 68 or another compartment in the gun stock not shown. The battery is of a sufficient capacity to provide several hours of bright light for purposes of illuminating targets during the night hours. A switch (not shown) for controlling the on/off setting for the light source can be provided on the gunstock within easy reach of the fingers or thumb of the user. The wires (not shown) for delivering electrical energy from the battery to the light source 116 can extend through an appropriate passage in the gunstock and through the central opening in the gun barrel.

OPERATION

While the operation of the video camera recording device 10 described above will be apparent to those of ordinary skill in the art, a brief discussion of the operation will be provided for convenience.

Normally, nothing is visible on the screen of the viewfinder as long as the video camera recorder 12 is off. Thus, when it is desired to record information on a recording medium inside the video camera recorder 12, such as a tape cassette, it is necessary to turn the video camera recorder on. This is accomplished by moving the grip 42 rearwardly so that the rod 43 will cause the lever 24 to pivot clockwise to bring the enlargement on the arm 29 into engagement with the on/off button 31 on the video camera recorder 12 to turn the camera on. Once the camera is turned on, a view will appear on the screen of the viewfinder 66, which view is along the line of sight 52 of the telephoto lense 61 on the video camera recorder 12. Once a target is brought into view on the screen of the viewfinder 66, and is further aligned with the line of sight 52, the user may then pull the trigger. This will indicate the moment in time that the user desires to "shoot" at the target. If the target is on the line of sight, the accuracy of the user's shot will be visible on the screen of the viewfinder as well as recorded on the recording medium inside the video camera recorder 12. In the embodiment illustrated in FIGS. 3, 4 and 6, the character generator 72 may cause designated indicia 91 (FIG. 1) to appear on the screen of the viewfinder 66. If desired, the indicia 91 can be controlled to appear on the screen of the viewfinder in response to an activation of the trigger 17.

In the embodiment wherein a lamp on the line of sight is utilized, which lamp becomes illuminated when the user pulls the trigger 17, the lamp will become illuminated as indicated in FIG. 11. If the target is within the ring 86, illumination of the light 81 will indicate the moment in time that the user believes that the target will be hit if an imaginary gunshot were fired from an actual rifle. The recording medium inside the video camera recorder will record this moment in time and can be critiqued at a later moment in time following the shooting event. In this embodiment, the character generator 72 could be controlled to provide the indicia 91 either continuously or in response to an activation of the trigger 17.

Referring now to FIG. 14, a competitive event can take place with each contestant A, B, C and D having a video camera recording device 10 in his or her possession. The video camera recording device in the hands of contestant A is connected by a wire 103A to a contestant control switch 104. Similarly, the video camera recorder on each of the video camera recording devices 10 in the hands of contestants B, C and D are connected by wires 103B, 103C and 103D, respectively, to the aforesaid contestant switch control device 104. The video signal from each of the video camera recorders is transmitted through the wires 103A to 103D through the contestant switch control device to a wire 106 to the video signal input terminals of a conventional television set 107. The wire 106 can also be connected to the video input terminals of a conventional video recorder 108. Further, the character generator 72 on each of the contestant's video camera recording device will be programed to present on the screen of the respective viewfinder and the screen of the television set 104 the name of the player. If contestant A is to be the first to "shoot" at a target, the contestant switch control device 104 will be switched so that video signals will be transmitted through the wires 103A and 106 to both the television set 107 and the video recorder 108. Thereafter, the target launcher 109 will launch a target 111 and contestant A will aim his or her video camera recording device 10 at the target 111 so launched. Once the contestant A believes that it is time to shoot at the target 111, the trigger can be pulled and, at that moment in time, a lamp 81 will be illuminated to indicate the timing of the contestants shooting at the target. Thus, an audience can view the screen of the television set 107 and note the accuracy of the shot. Thereafter, each of contestants B, C and D will perform the same task and the results of their respective shots will be viewed on the screen of the television set and recorded on the video recorder 108. The results of each contestant's shooting can be later examined by a panel of judges and the contestant having the most accurate shots will be awarded the victor's prize.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A video camera recording device, comprising:
   means defining an elongated gunstock;
   means defining a mounting platform adapted to receive thereon a hand-held video camera recorder means having a lense structure thereon defining a line of sight, a recording medium for recording video information, and a viewfinder;
   support means for interconnecting said gunstock to said mounting platform means;
   switch means for effecting a sequential activating and deactivating of said video camera recorder means for the purpose of starting a recording of video information on said recording medium and stopping the recording, respectively;
   gun sight means located in said line of sight so as to be visible through said viewfinder when said video camera recorder means is recording video information on said recording medium;

means defining a trigger on said gunstock adapted to be manually activated by a finger of a user's hand; and means for generating a signal visible through said viewfinder in response to the user activating said trigger, said signal also being simultaneously recorded on said recording medium so that the user can effect an activating of said video camera recorder means by operation of said switch means, by aiming said line of sight at a target so as to bring said target into view through said viewfinder and to simultaneously record said target on said recording medium, by aligning said target with said gun sight means and said line of sight, by activating said trigger to activate said means for generating a signal visible through said viewfinder and to simultaneously record said signal on said recording medium, and by operation of said switch means again to deactivate said video camera recorder means.

2. A video camera recording device according to claim 1, wherein said means for generating a signal includes an electric lamp and electric circuit means for effecting an illumination of said lamp in response to an activating of said trigger.

3. A video camera recording device according to claim 2, wherein said lamp is embodied in said gun sight means and is located on said line of sight.

4. A video camera recording device according to claim 3, including an elongated gun barrel extending from said mounting plate means, wherein said gun sight means includes a pedestal means mounted on said gun barrel, and an annular ring mounted on said pedestal means, said annular ring defining a generally circular opening the center of which lies on said line of sight, said lamp being located in the center of said annular ring when viewed through said viewfinder.

5. A video camera recording device according to claim 4, wherein said annular ring is defined by an elongated cylinder having a finite wall thickness, a radially inner edge at an end of said cylinder remote from said video camera recorder means being beveled to define a reflective surface for reflecting light from said lamp onto said interior surface of said cylinder so that a ring of reflected light will be visible through said viewfinder, said line of sight being congruent with a central axis of said cylinder.

6. A video camera recording device according to claim 5, wherein said gun sight means includes a further pedestal means located adjacent an end of said gun barrel remote from said gunstock, and a further annular ring mounted on said further pedestal and oriented so that a circular opening thereof has its center lying on said line of sight.

7. A video camera recording device according to claim 6, wherein said annular ring and said further annular ring have the same internal diameter.

8. A video camera recording device according to claim 1, wherein said means for generating a signal includes a character generator means for presenting to said viewfinder a title or other indicia.

9. A video camera recording device according to claim 8, including an elongated gun barrel extending from said mounting plate means, wherein said means for generating a signal also includes an electric lamp and electric circuit means for effecting illumination of said lamp in response to an activating of said trigger, said lamp being oriented on said gun barrel on said line of sight.

10. A video camera recording device according to claim 9, wherein said gunstock includes means defining a compartment therein and a removable cover providing access to said compartment; and wherein said character generator means and at least a portion of said electric circuit means are housed in said compartment.

11. A video camera recording device according to claim 1, wherein said video camera recorder means includes first manually operable means for varying the optics of a telephoto lense means between limits of adjustment thereof, said optics of said telephoto lense means being oriented in alignment with said line of sight; and wherein a second manually operable means is mounted on said gunstock within reach of a hand of the user to facilitate the simultaneous engagement of said trigger and said second manually operable means by the fore finger and thumb, respectively, of the aforesaid user's hand.

12. A video camera recording device according to claim 11, wherein said means for generating a signal includes an electric lamp and electric circuit means for effecting an illumination of said lamp in response to an activating of said trigger.

13. A video camera recording device according to claim 12, wherein said lamp is embodied in said gun sight means and is located on said line of sight.

14. A video camera recording device according to claim 13, including an elongated gun barrel extending from said mounting plate means, wherein said gun sight means includes a pedestal means mounted on said gun barrel, and an annular ring mounted on said pedestal means, said annular ring defining a generally circular opening the center of which lies on said line of sight, said lamp being located in the center of said annular ring when viewed through said viewfinder.

15. A video camera recording device according to claim 11, wherein said mounting means also provides a connection of said second manually operable means to said gunstock.

16. A video camera recording device according to claim 1, wherein a plurality of said video camera recording devices are provided, each operable by a separate contestant in a contest;

wherein said video camera recorder means on each video camera recording device held by each contestant includes means for transmitting a signal from each contestant's video camera recording device to at least a video recording means.

17. The video camera recording device according to claim 16, wherein said video recording means includes a television set facilitating a simultaneous viewing of a contestant's use of said video camera recording device.

18. The video camera recording device according to claim 17, wherein said video recording means further includes a contestant switch control device for facilitating the transmission of only a single contestant at a time to said video recording means and said television set.

19. The video camera recording device according to claim 1, including an elongated gun barrel extending from said mounting plate means, wherein said switch means is provided on said gun barrel and includes means defining a reciprocal slide and connecting means for effecting an activating and deactivating of said video camera recorder means in response to a reciprocating of said reciprocal slide.

20. The video camera recording device according to claim 1, including an elongated gun barrel extending from said mounting plate means, and including an electric lamp means mounted adjacent a free end of said barrel for illuminating a target.

* * * * *